US012779646B2

(12) United States Patent
Kudernatsch

(10) Patent No.: US 12,779,646 B2
(45) Date of Patent: Nov. 3, 2026

(54) VIBRATION REDUCING SPRING DAMPER HAMMER

(71) Applicant: Advanced Biomechanical Solutions LLC, Wilmington, DE (US)

(72) Inventor: Simon Kudernatsch, West Hartford, CT (US)

(73) Assignee: Advanced Biomechanical Solutions, LLC, Wilmington, DE (US)

( * ) Notice: Subject to any disclaimer, the term of this patent is extended or adjusted under 35 U.S.C. 154(b) by 308 days.

(21) Appl. No.: 18/767,387

(22) Filed: Jul. 9, 2024

(65) Prior Publication Data

US 2026/0014688 A1 Jan. 15, 2026

(51) Int. Cl.
*B25D 1/12* (2006.01)

(52) U.S. Cl.
CPC ..................................... *B25D 1/12* (2013.01)

(58) Field of Classification Search
CPC ... B25D 1/00; B25D 1/02; B25D 1/06; B25D 1/12; B25D 2250/231; B25D 2250/371
See application file for complete search history.

(56) References Cited

U.S. PATENT DOCUMENTS

| | | | | |
|---|---|---|---|---|
| 455,776 | A | 7/1891 | Street | |
| 592,278 | A | 10/1897 | Clark | |
| 698,631 | A | 4/1902 | Carlisle | |
| 712,983 | A | 11/1902 | Voight | |
| 759,556 | A | 5/1904 | Scholtes | |
| 832,455 | A | 10/1906 | Christensen | |
| 838,865 | A | 12/1906 | Kihlmark | |
| 842,323 | A | 1/1907 | Malloy | |
| 870,672 | A | 11/1907 | Frink et al. | |
| 886,987 | A | 5/1908 | Kiehle | |
| 899,287 | A | 9/1908 | Blakeley | |
| 957,924 | A | 5/1910 | Young | |
| 974,021 | A | 10/1910 | Blake | |
| 1,042,177 | A | 10/1912 | Vredenburg | |
| 1,045,145 | A * | 11/1912 | Hubbard | B25D 1/12 81/22 |
| 1,114,910 | A | 10/1914 | Reed | |
| 1,159,583 | A | 11/1915 | Haight | |
| 1,182,348 | A | 5/1916 | Charley | |
| 1,287,619 | A | 12/1918 | Benjamin | |

(Continued)

FOREIGN PATENT DOCUMENTS

| | | | |
|---|---|---|---|
| CH | 408541 | 2/1966 | |
| CN | 106142012 A * | 11/2016 | B25D 1/02 |

(Continued)

OTHER PUBLICATIONS

ISR for PCT/US2025/031309, mailed Oct. 6, 2025.
WO of ISR for PCT/US2025/031309, mailed Oct. 6, 2025.

*Primary Examiner* — David B. Thomas
(74) *Attorney, Agent, or Firm* — McHale & Slavin, P.A.

(57) ABSTRACT

Disclosed is a hammer that employs a Vibration Reducing Spring Damper (VRSD) assembly mechanism that dampens the vibration impact using a mass-spring-damper system connected in series while the release and catch mechanics of expert hammer users at the moment of impact with an object is maintained. The invention improves on the conventional hammer strike and recoil mechanics, while still maintaining the kinematic and kinetic performance of the hammer.

16 Claims, 18 Drawing Sheets

(56) References Cited

U.S. PATENT DOCUMENTS

| | | | | |
|---|---|---|---|---|
| 1,340,401 | A | 5/1920 | Olney | |
| 1,660,237 | A | 2/1928 | Small | |
| 2,365,463 | A | 12/1944 | Formhals | |
| 2,593,663 | A | 4/1952 | Fanelli | |
| 5,282,805 | A * | 2/1994 | Richelsoph | A61F 2/4607 606/100 |
| 6,457,384 | B1 * | 10/2002 | Cox | B25D 1/02 81/22 |
| 6,463,832 | B1 * | 10/2002 | Cox | B25D 1/12 81/22 |
| 8,534,643 | B2 | 9/2013 | Lombardi et al. | |
| 9,408,428 | B2 * | 8/2016 | Gaudet | F15B 15/226 |
| 9,982,733 | B2 * | 5/2018 | Shih | A63B 60/54 |
| 10,683,905 | B2 * | 6/2020 | Shih | B25D 1/12 |
| 12,030,166 | B2 * | 7/2024 | Shih | B25D 1/12 |
| 12,472,617 | B2 * | 11/2025 | Hanlon | B25D 1/12 |
| 2012/0180200 | A1 * | 7/2012 | Gaudet | F16F 9/103 92/143 |
| 2018/0264635 | A1 * | 9/2018 | Liu | B25G 3/26 |
| 2023/0150107 | A1 * | 5/2023 | Hanlon | B25G 3/26 81/22 |
| 2023/0286124 | A1 * | 9/2023 | Moore | B25D 1/06 |
| 2024/0091921 | A1 * | 3/2024 | Shih | F16F 1/025 |
| 2025/0187165 | A1 * | 6/2025 | Newkirk | B25D 1/12 |

FOREIGN PATENT DOCUMENTS

| | | |
|---|---|---|
| EP | 0549362 | 6/1993 |
| EP | 3795301 | 3/2021 |
| EP | 4342636 | 3/2024 |

* cited by examiner

VIBRATION REDUCING SPRING DAMPER HAMMER

FIELD OF THE INVENTION

This invention is directed to hand-held tools and, in particular, to a vibration reducing spring damper hammer.

BACKGROUND OF THE INVENTION

Hammers are used in various industrial sectors, but they are ever present in the construction industry. Basically, a hammer is a versatile hand tool primarily used for driving nails into wood. As a result, hammers may subject the user to work-related Musculoskeletal Disorders (WMSD). Punnett and Wegmen 2004, define WMSD as a wide range of inflammatory and degenerative conditions affecting the muscles, tendons, ligaments, joints, peripheral nerves, and supporting blood vessels. WMSD's are an enormous financial cost to employers, but the quality of life cost to the employee is devastating. For instance, repeated or prolonged use of a hammer, especially in awkward positions or with excessive force, can lead to conditions such as:

Tendonitis: Inflammation of tendons, often due to repetitive strain.

Carpal Tunnel Syndrome: Compression of the median nerve in the wrist, which can be exacerbated by repeated hammering motions.

Tennis Elbow: Inflammation of the tendons on the outer part of the elbow, often caused by repetitive wrist and arm movements.

Hand-Arm Vibration Syndrome (HAVS): Prolonged use of vibrating tools can cause damage to the nerves, blood vessels, and muscles in the hands and arms.

Muscle Strain: Overuse or improper use of muscles can lead to strains, particularly in the hands, wrists, forearms, and shoulders.

According to the International Labor Organization (ILO) occupational health and safety encompasses the social, mental, and physical well-being of workers, which is the person. Ergonomics is defined as the application of scientific principles, methods, and data drawn from a variety of disciplines to the development of engineered systems in which people play significant roles (Kroemer, 2006). There are three straightforward steps that must be kept in mind to accomplish Ergonomics effectively (Kroemer, 2006): 1) Make work easy to do, avoid fatiguing postures and highly repetitive tasks; 2) Ask people for their opinions and judgments of conditions of their work; 3) Strive to improve.

What is lacking in the art is an ergonomic vibration reducing spring damper hammer.

PRIOR ART REFERENCES

Known prior art modulate the conventional hammer design without remarkable mitigation of one of the leading causes of Work-related Musculoskeletal Disorders, namely vibration. Known prior art includes Patent Registrations: U.S. Pat. No. 8,534,643—Hammer; U.S. Pat. No. 974,021A—Hammer; U.S. Pat. No. 832,455A—Combination tool; U.S. Pat. No. 1,042,177A—Hammer; U.S. Pat. No. 886,987A—Combination tool; U.S. Pat. No. 712,983A—Hammer; U.S. Pat. No. 1,660,237A—Claw hammer; U.S. Pat. No. 1,182,348A—Hammer; U.S. Pat. No. 899,287A—Combination tool; U.S. Pat. No. 1,287,619A—Claw hammer; U.S. Pat. No. 1,340,401A—Hatchet; U.S. Pat. No. 2,593,663A—Tool for severing metal bands on crates; U.S. Pat. No. 1,114,910A—Nail extracting hatchet; U.S. Pat. No. 455,776A—Hammer; U.S. Pat. No. 838,865A—Hatchet; U.S. Pat. No. 592,278A—Hammer; U.S. Pat. No. 759,556A—Hammer; U.S. Pat. No. 842,323A—Hammer; U.S. Pat. No. 1,159,583A—Hammer; U.S. Pat. No. 2,365,463A—Nail pulling tool; U.S. Pat. No. 870,672A—Combination tool; U.S. Pat. No. 698,631A Nail holding attachment for hammers; U.S. Pat. No. 957,924A—Tack hammer and puller.

SUMMARY OF THE INVENTION

Disclosed is a hammer that dampens the vibration impact using a mass-spring-damper system connected in series while the release and catch mechanics of expert hammer users at the moment of impact with an object is maintained. The strike spot of the disclosed hammer is flat in shape to avoid shear and impact loss that can occur from the typical convex shape. The instant hammer maintains a claw providing the ability to remove a nail.

An objective of the invention is to provide an ergonomic vibration reducing spring damper hammer.

Another objective of the invention is to improve on the conventional hammer strike and recoil mechanics, while still maintaining the kinematic and kinetic performance of the hammer.

Still another objective of the invention is to provide a hammer that reduces the vibrational impact forces on the hand-arm system of the human operator.

Yet still another objective of the invention is to provide a hammer that reduces vibration exposure by up to 65% over from commercially available anti-vibration hammers following the International Organization for Standardization (ISO) 5349-1:2001 Mechanical vibration parameters to measure hand-arm vibration.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
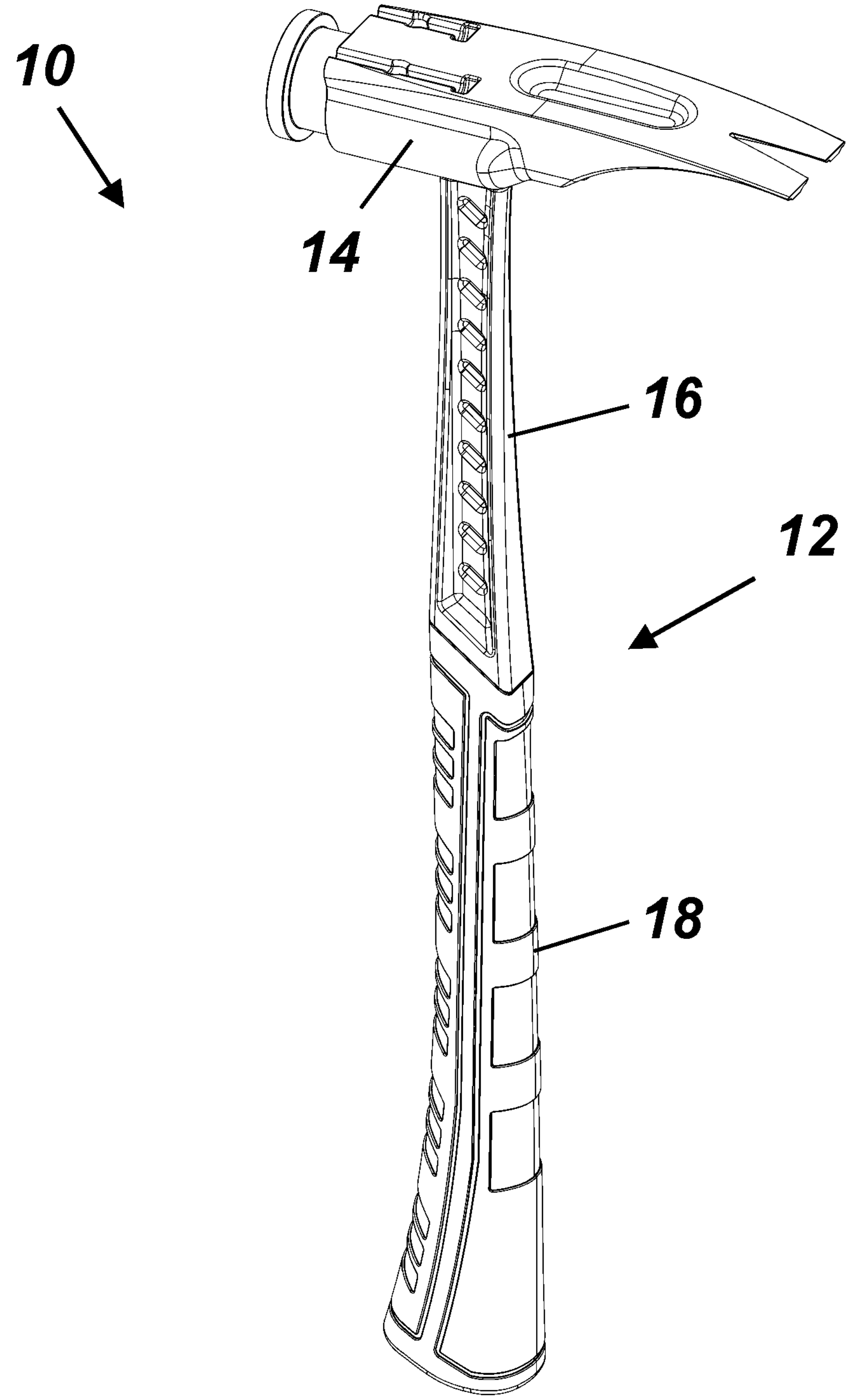
FIG. 1 is a upper perspective view of the instant invention.
Figure 2:
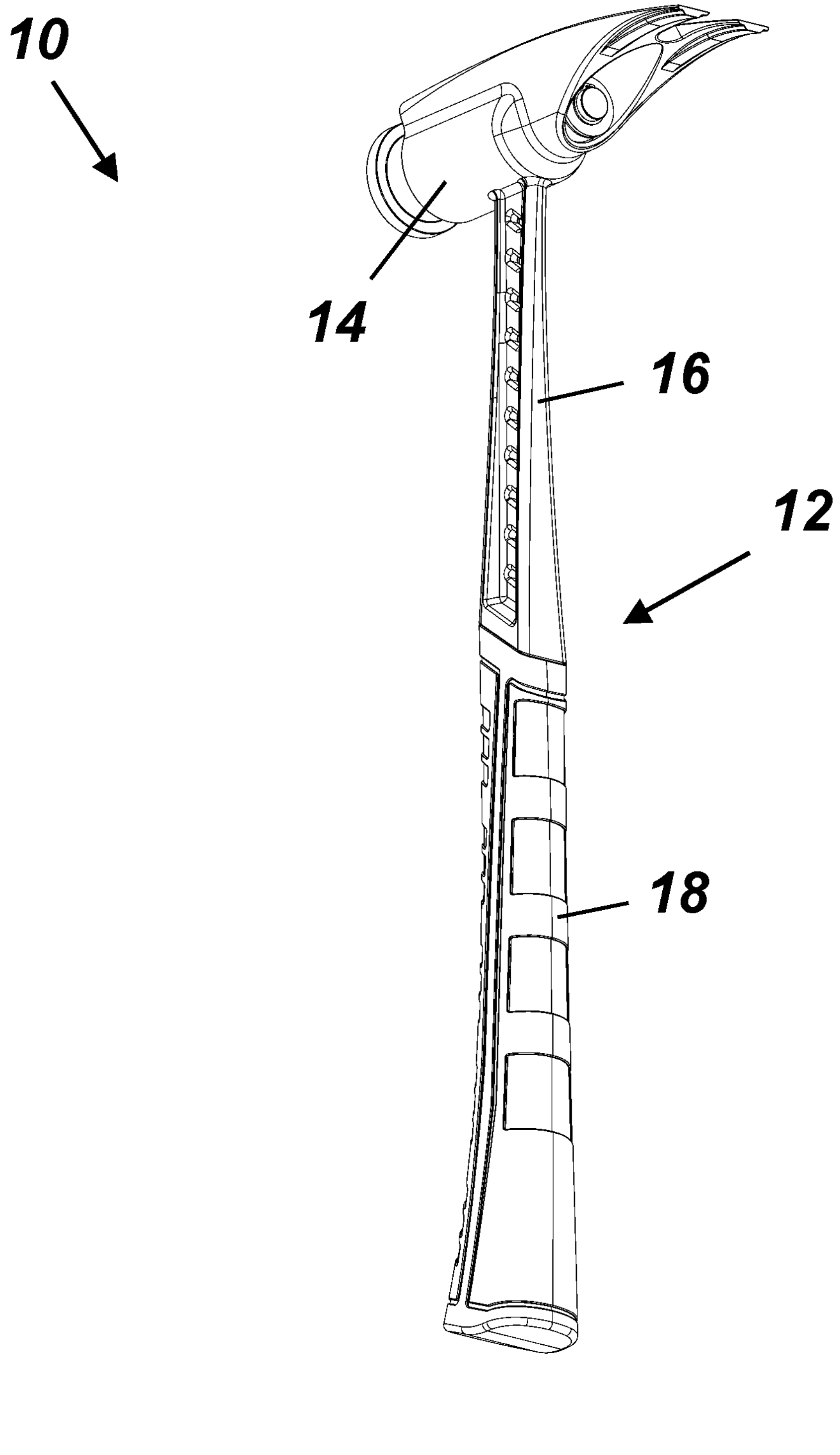
FIG. 2 is a lower perspective view thereof.
Figure 3:
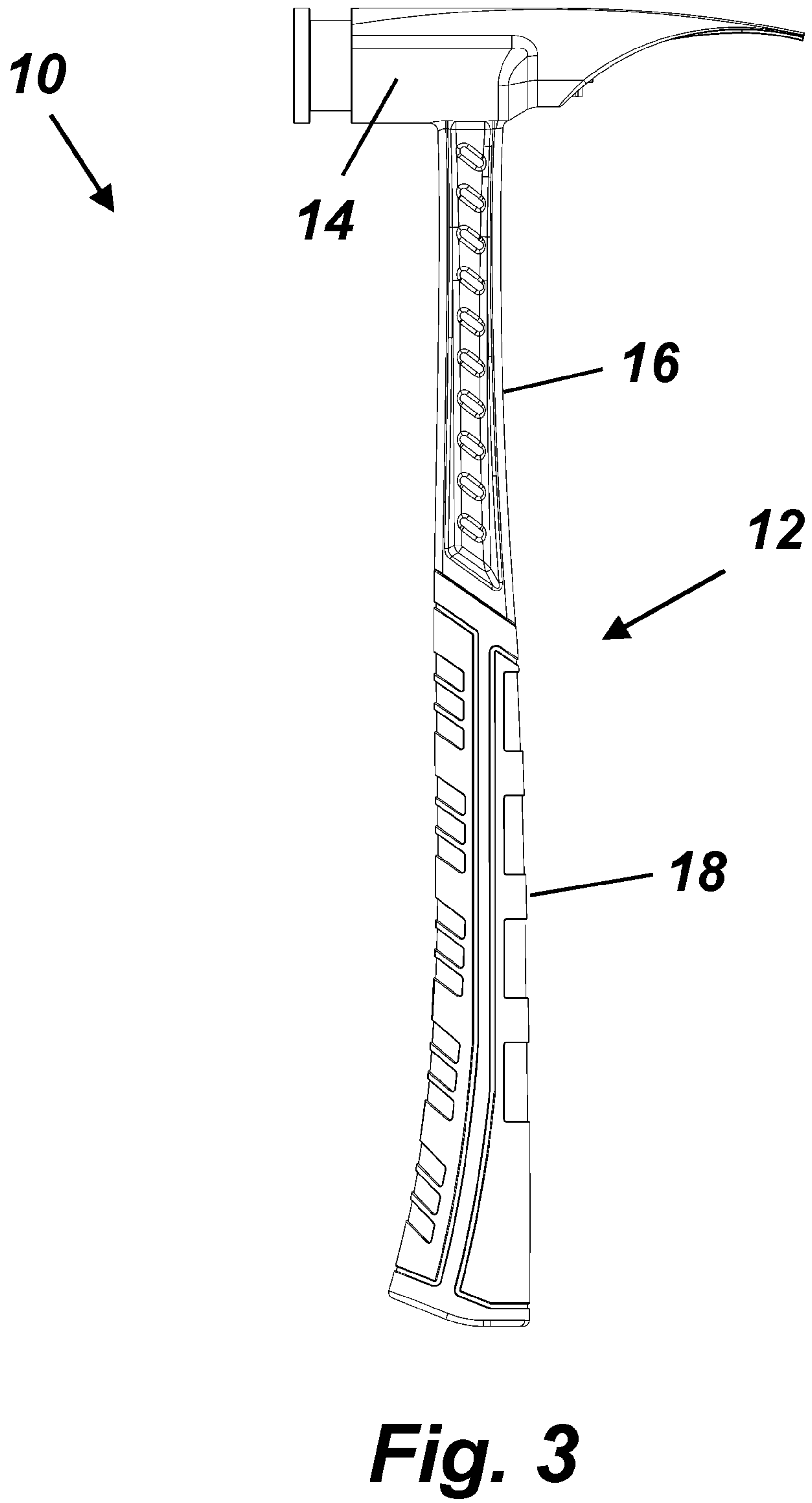
FIG. 3 is a left side view thereof.
Figure 4:
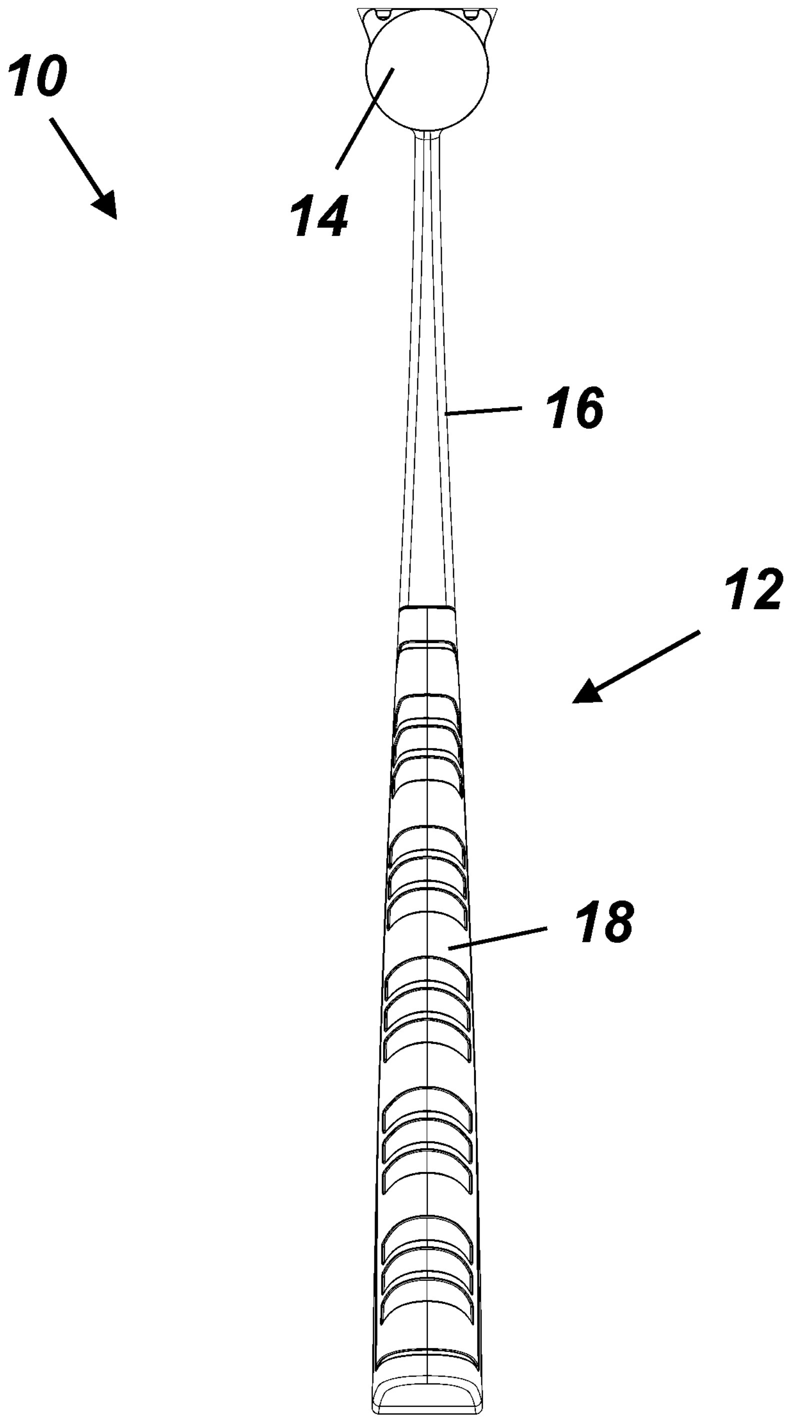
FIG. 4 is a front view thereof.
Figure 5:
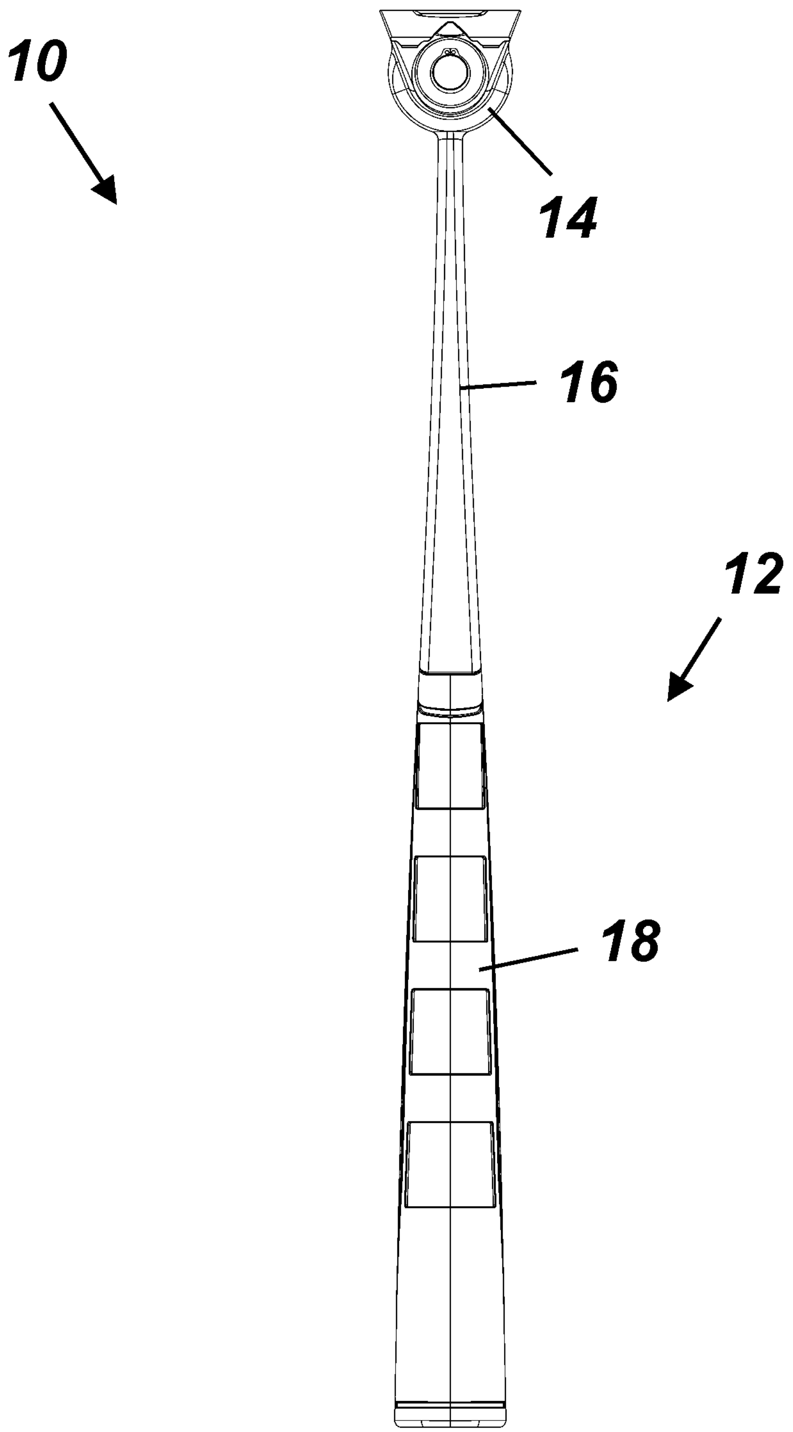
FIG. 5 is a rear view of thereof.
Figure 6A:
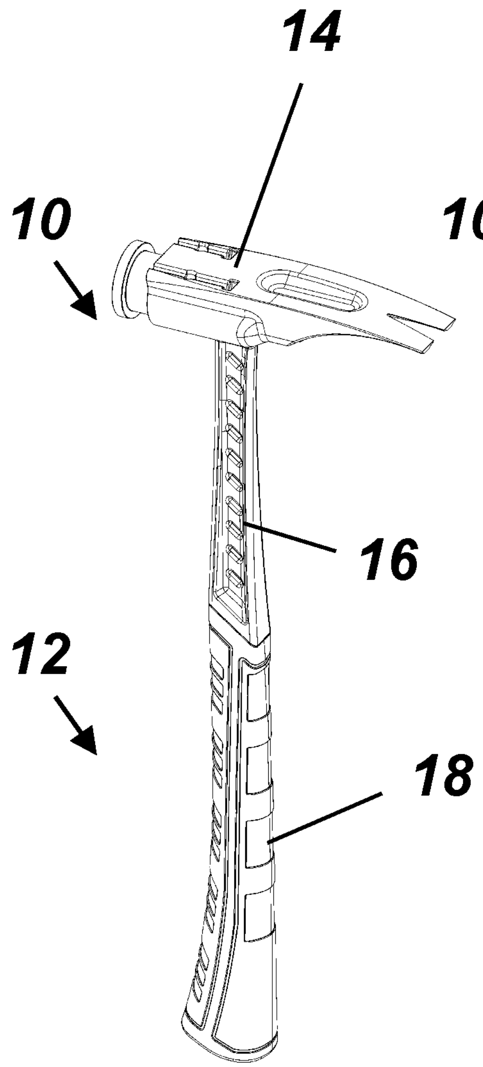
FIG. 6A is a upper perspective view thereof.
Figure 6B:
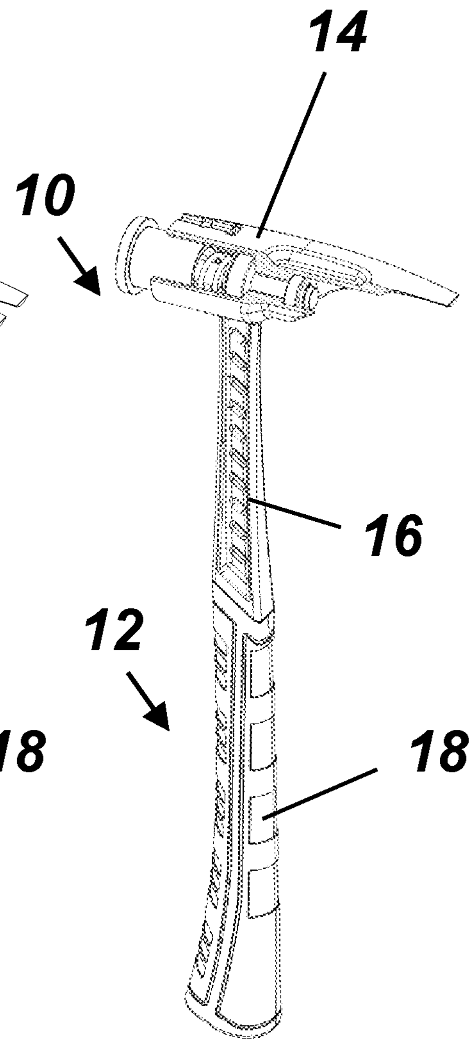
FIG. 6B is a cross-sectional view depicting the mechanism assembly.
Figure 6C:
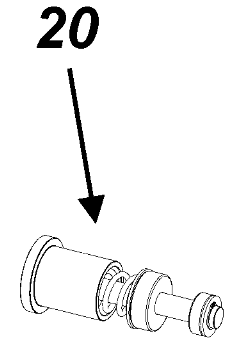
FIG. 6C is a perspective view of the mechanism assembly.
Figure 7:
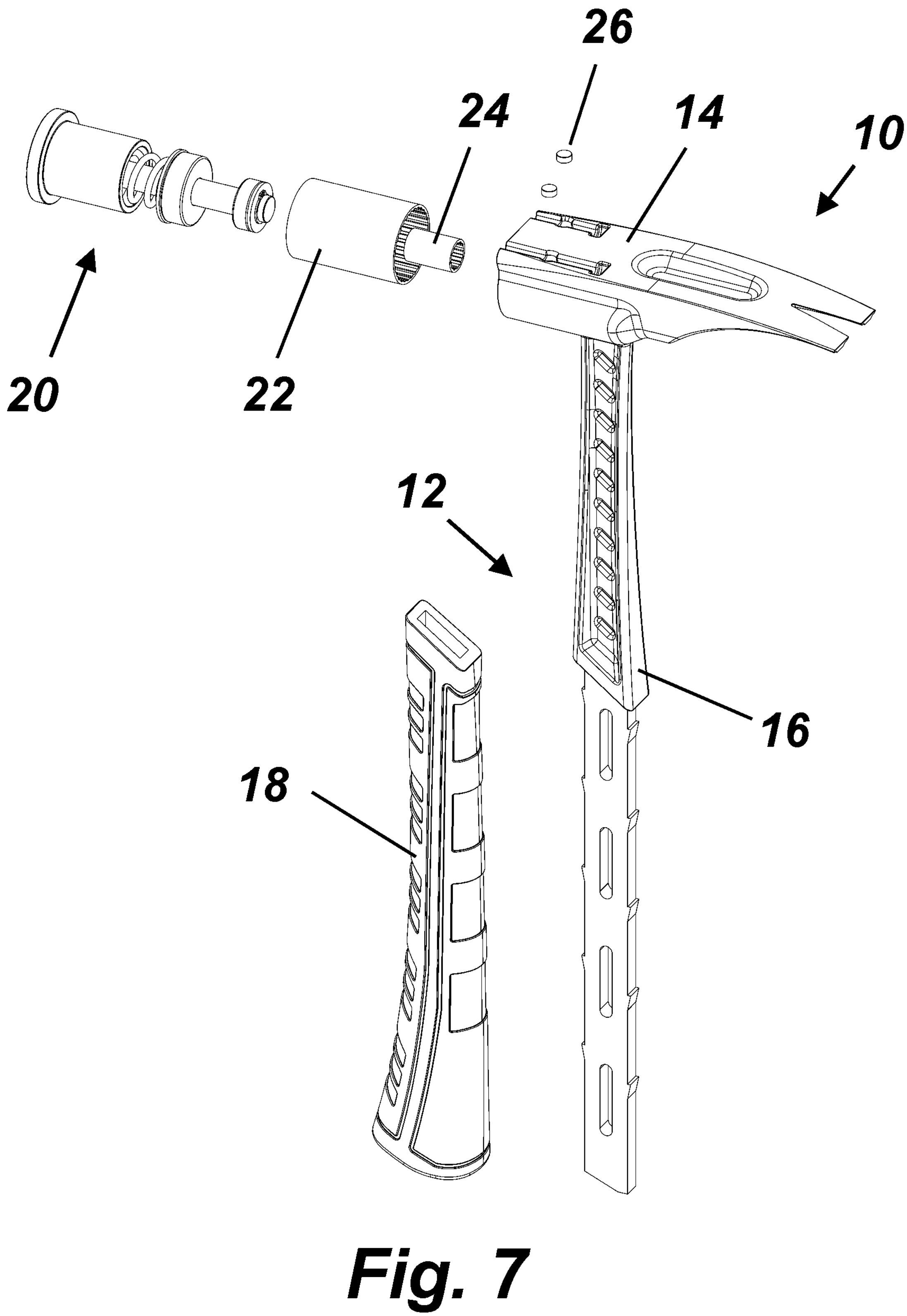
FIG. 7 is an exploded view of all major components of the hammer.
Figure 8:
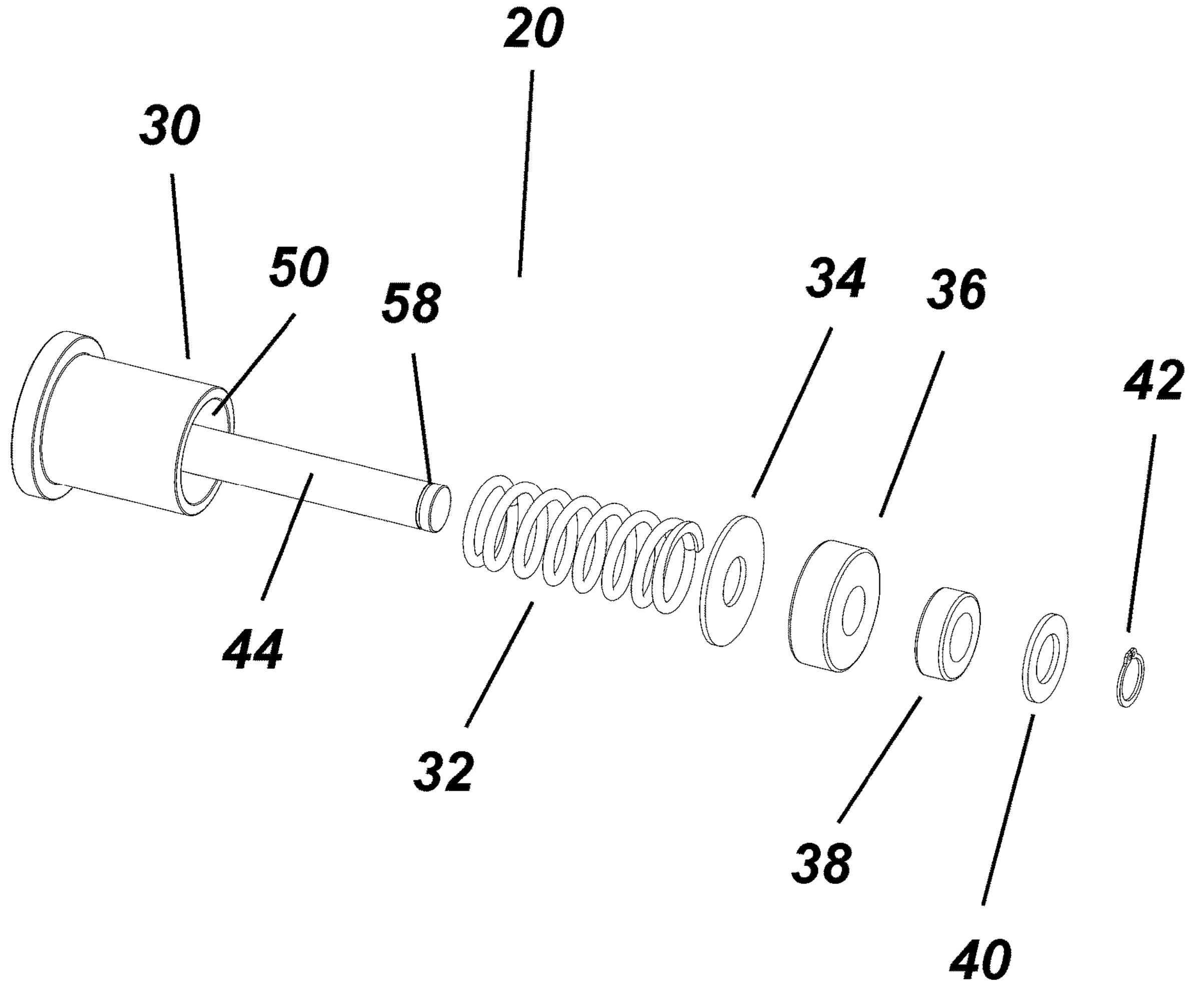
FIG. 8 is an exploded view of the mechanism assembly.
Figure 9:
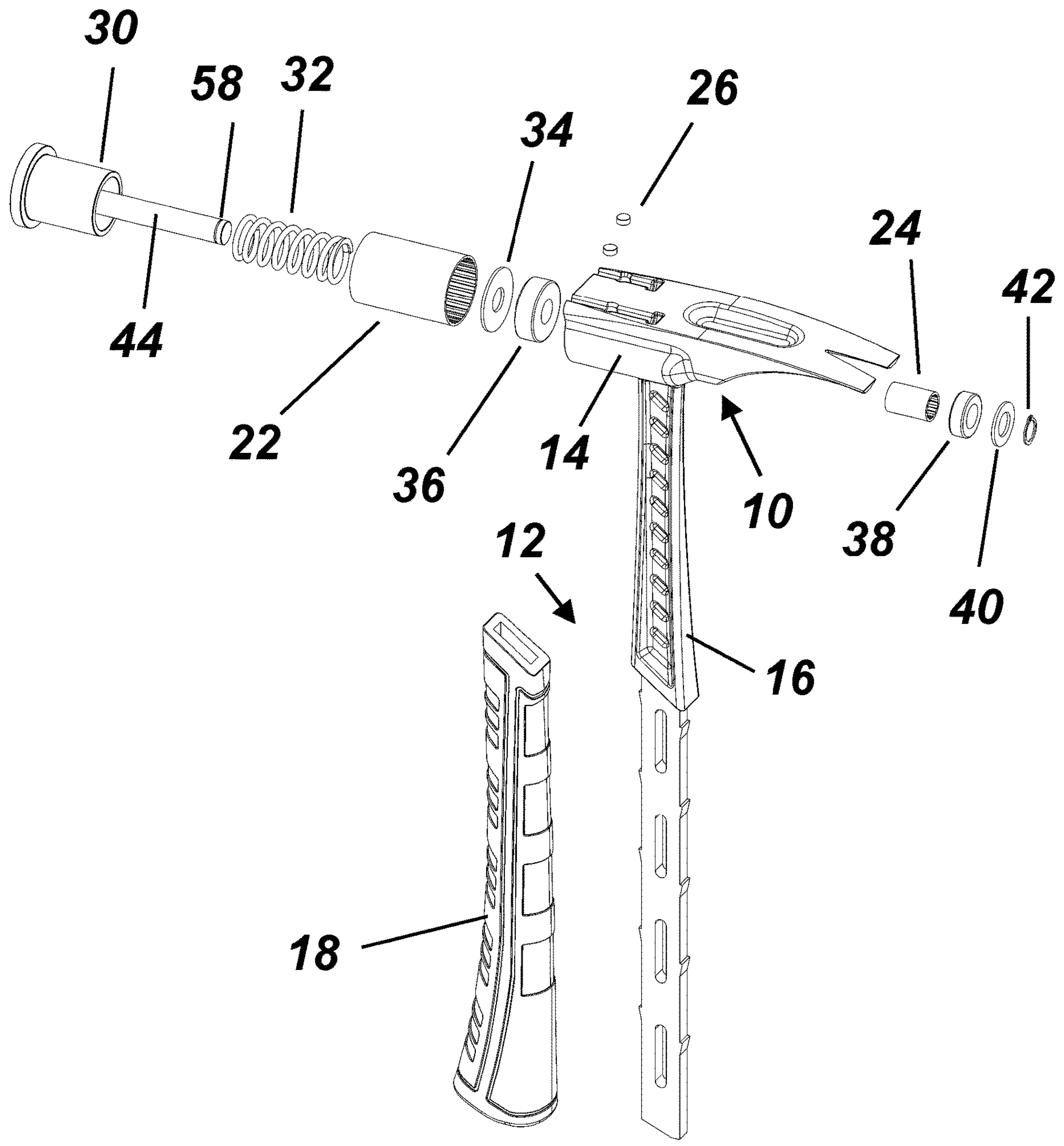
FIG. 9 is an upper perspective exploded view of the entire hammer.
Figure 10A:
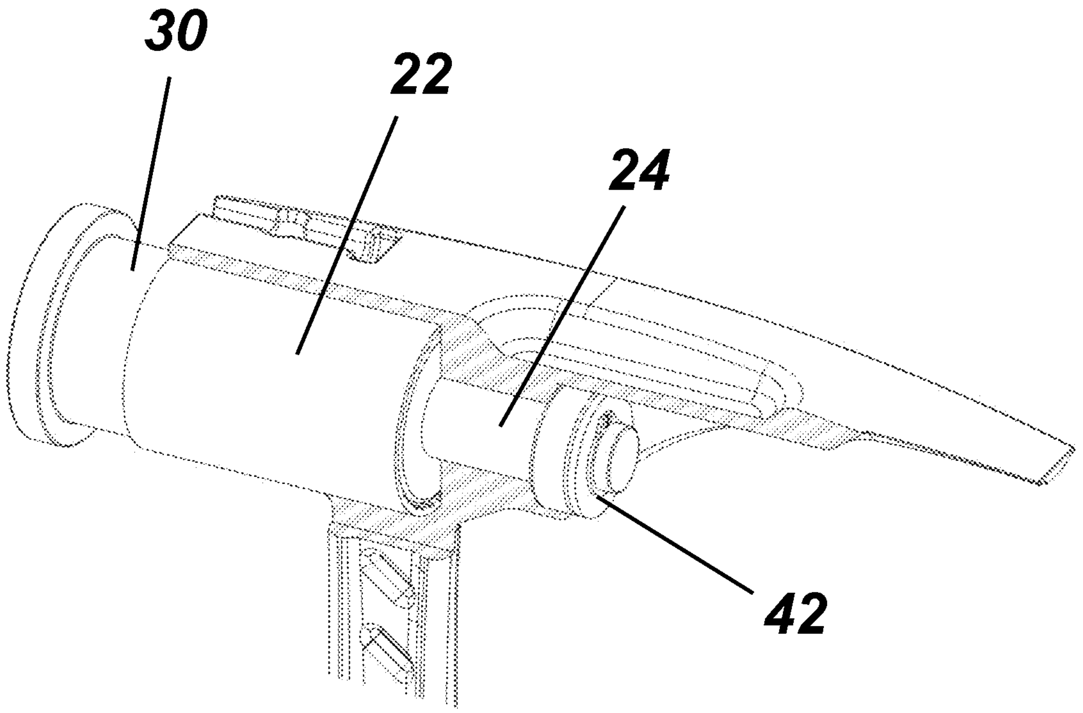
FIG. 10A is a top perspective sectional view of the mechanism assembly with friction reducing sleeves.
Figure 10B:
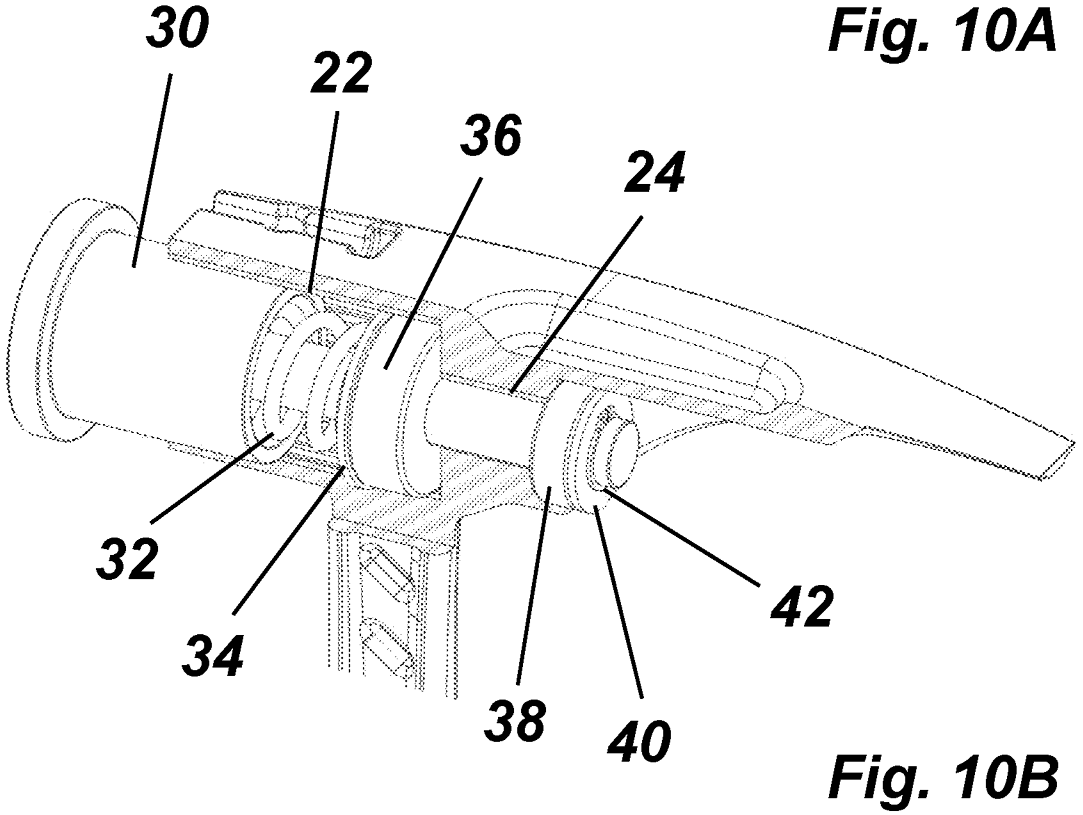
FIG. 10B is a top perspective sectional view of the mechanism assembly without friction reducing sleeves.
Figure 11:
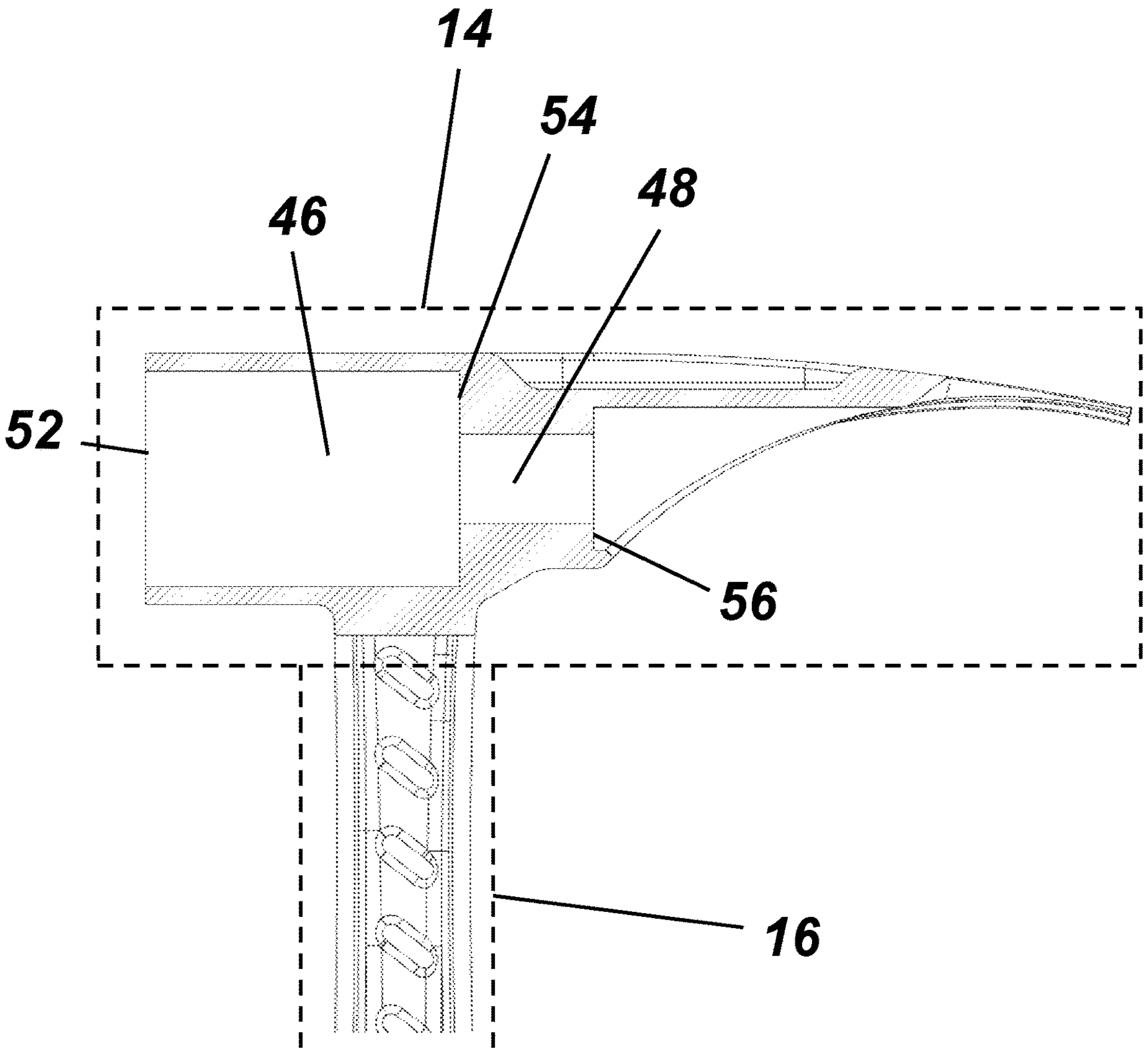
FIG. 11 is a cross sectional side view of the hammer head cavity and through hole.
Figure 12:
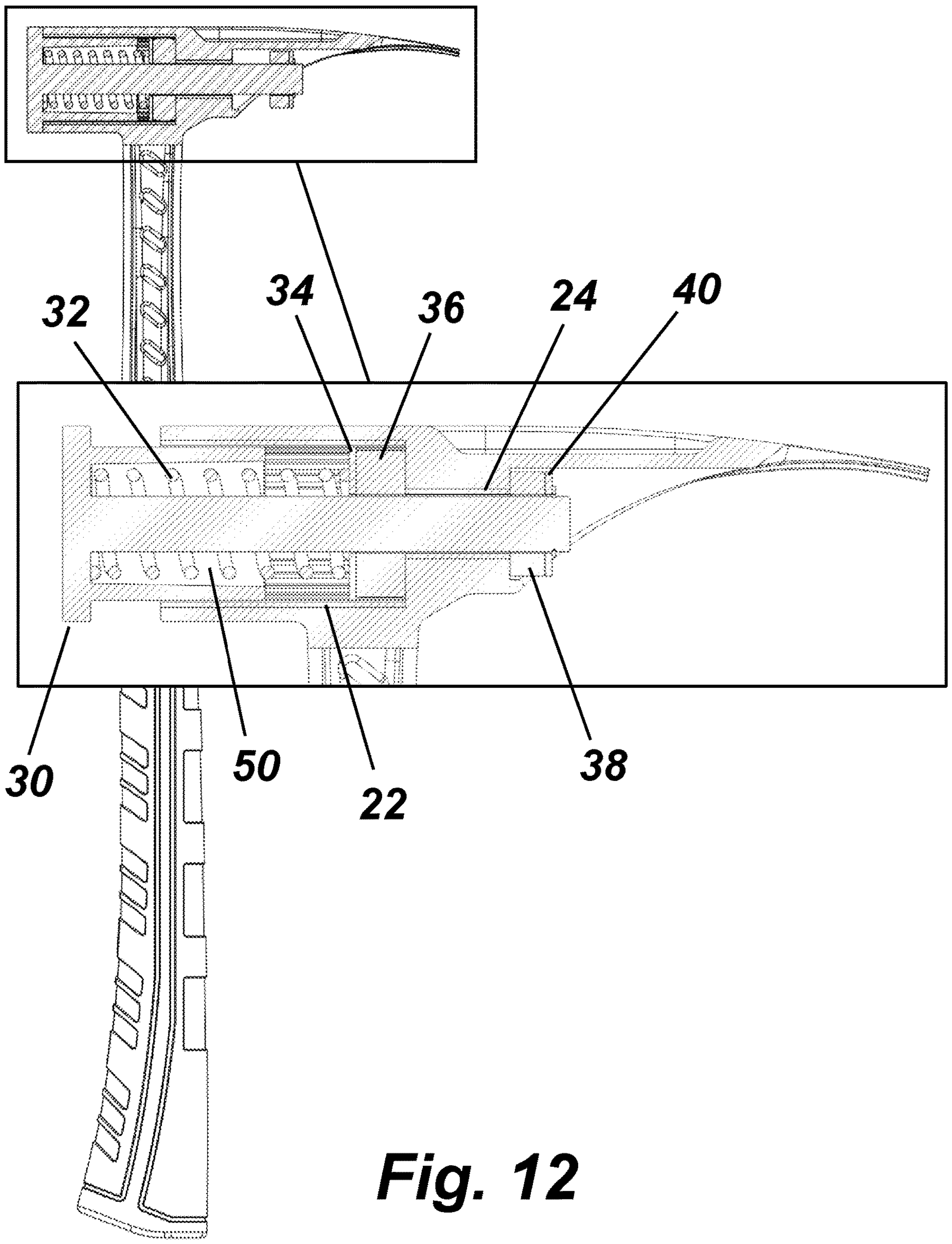
FIG. 12 is a cross-sectional view of components of the hammer head.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the FIGS. in general, the Vibration Reducing Spring Damper (VRSD) hammer 10 consists of the hammer body 12 having a head portion 14, a neck portion 16, and a grip portion 18. The hammer 10 also includes a VRSD mechanism assembly 20, a large 22 and small 24 friction reducing sleeves, and two magnets 26. The VRSD mechanism assembly 20 is housed within a cavity 28 the hammer body 12 head portion 14. The large 22 and small 24 friction reducing sleeves are housed inside the head portion 14 of the hammer body 12.

The VRSD mechanism assembly 20 consists of an impact hammer head 30, a compression spring 32, a front washer 34, a front damper 36, a rear damper 38, a rear washer 40, and a retaining ring 42.

A shaft 44 of the impact hammer head 30 extends through the entire hammer head portion 14 of the hammer body 12. The impact hammer head 30 is mainly housed inside the hammer head chamber 46 with the shaft 44 extending therethrough the hammer head portion 14 through an aperture 48. The compression spring 32 is positioned inside of the impact hammer head 30 cavity 50 and rests against a first wall 52 of the cavity 50 on one side and against the front washer 34 on a second wall 54 of the cavity 50. In this configuration, the compression spring 32 is in its resting state and slightly pre-tensioned. Pre-tension of the compression spring 32 ensures there are no loosely moving parts in the VRSD hammer 10 resting state. The front damper 36 is sandwiched and secured between the front washer 34 and the first wall 52 of the cavity 50. The rear damper 38 is sandwiched and secured between the through hole wall 56 and the rear washer 40. The VRSD mechanism assembly 20 is held together by a retaining ring 42 secured along a distal end 58 of the VRSD mechanism assembly 20 to the head portion 14. In a preferred embodiment, both front 36 and rear 38 dampers are made of a viscoelastic material such as Sorbothane®.

Figure 13A:
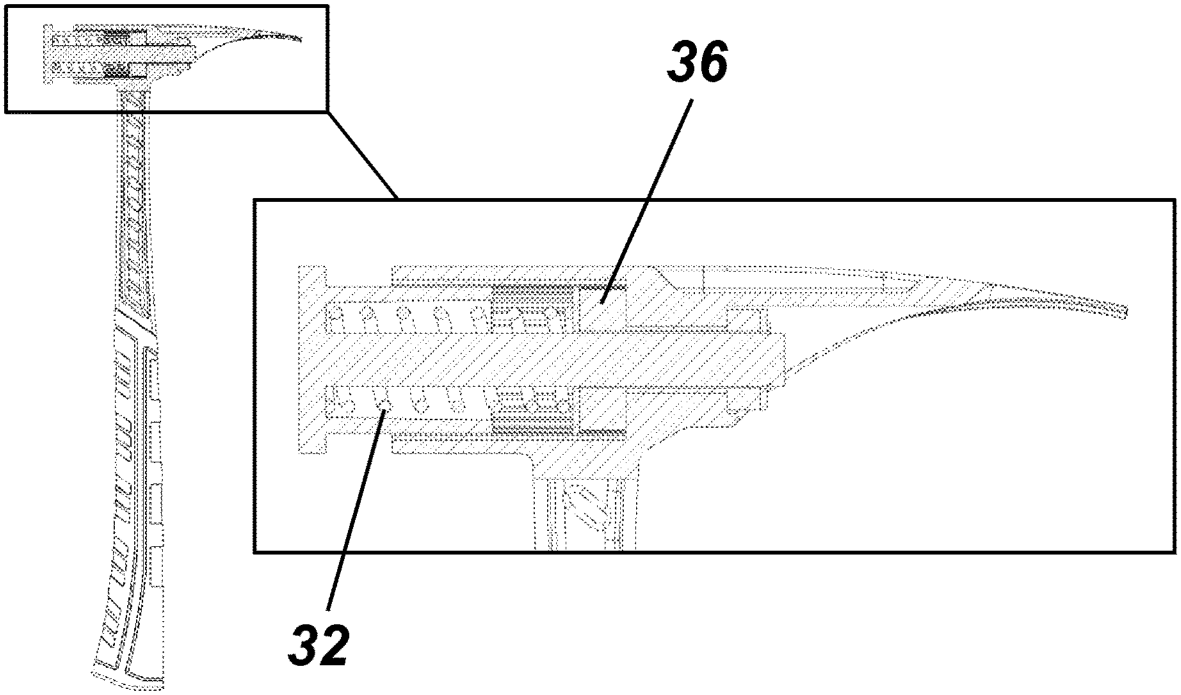
FIG. 13A is a side view of mechanism assembly in the resting state.
Figure 13B:
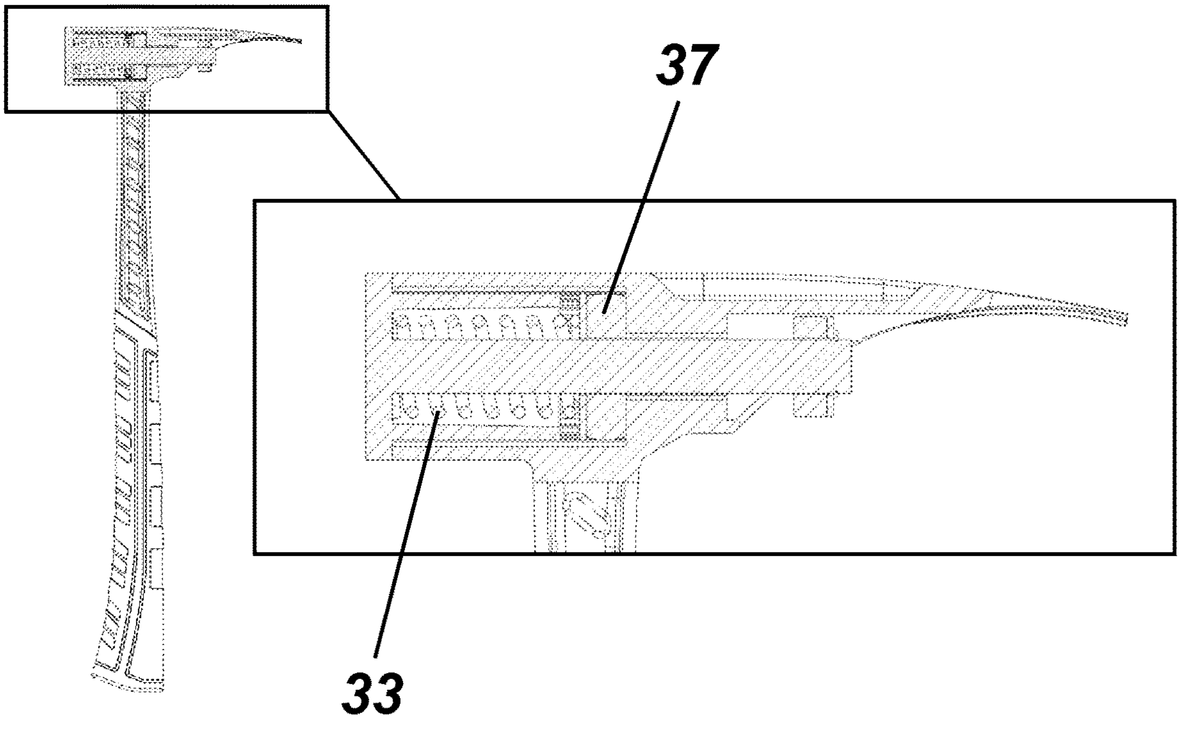
FIG. 13B is a side view of the mechanism assembly in the compressed state.

Referring to FIG. 13B, upon contact with the striking object, the impact hammer head 30 is forced to retract inside the hammer head chamber 46 thus forcing the compression spring 32 and the front damper 36 into their compressed states 33 and 37, respectively. In the same FIG. 13B, this is compared to the resting scenario in FIG. 13A to illustrate the differences. The combination of the compression spring 32 and the front damper 36 creates a spring-damper system which reduces the amount of vibration that propagates into user's hand when using non-VRSD (standard) framing hammer design. After striking depicted in FIG. 13B, the compression spring 32 returns from its compressed state 33 to its resting state 32, this inevitably initiates a vibration shock related to the spring in its compressed state 33 returning to the resting state 32. The rear damper 38 is present to mitigate this action.

Figure 14A:
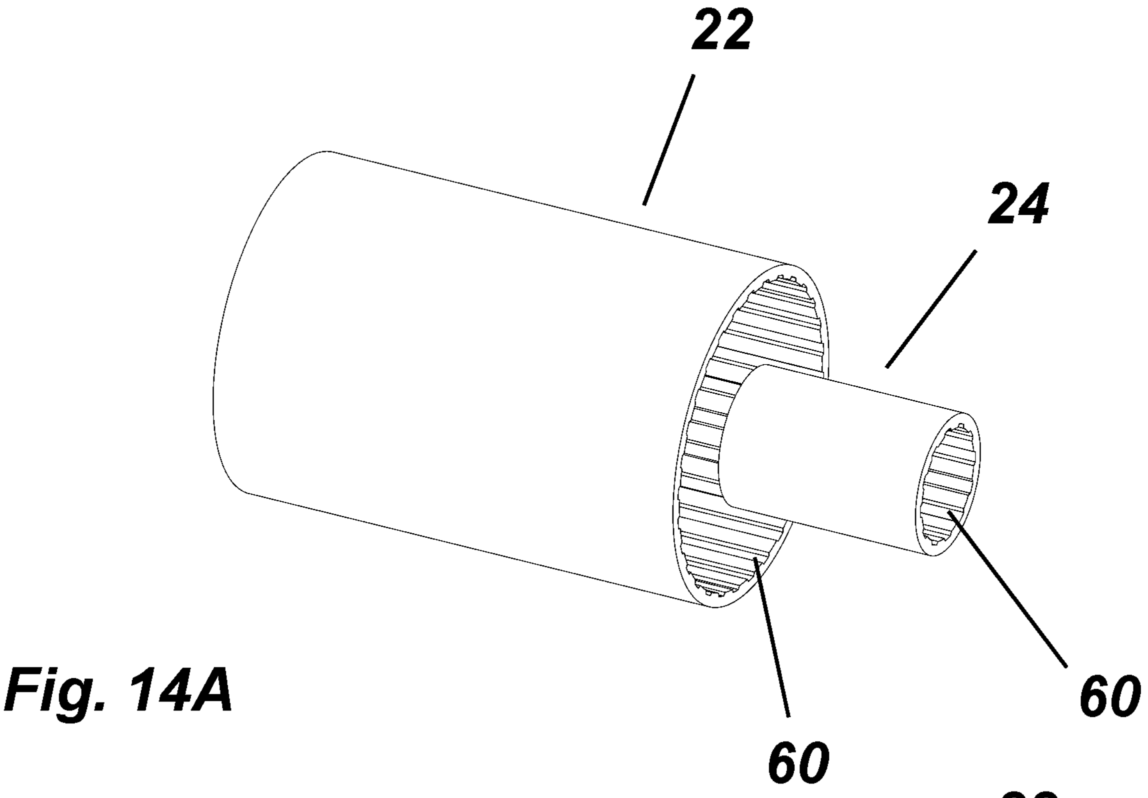
FIG. 14A is a perspective view of both friction reducing sleeves.
Figure 14B:
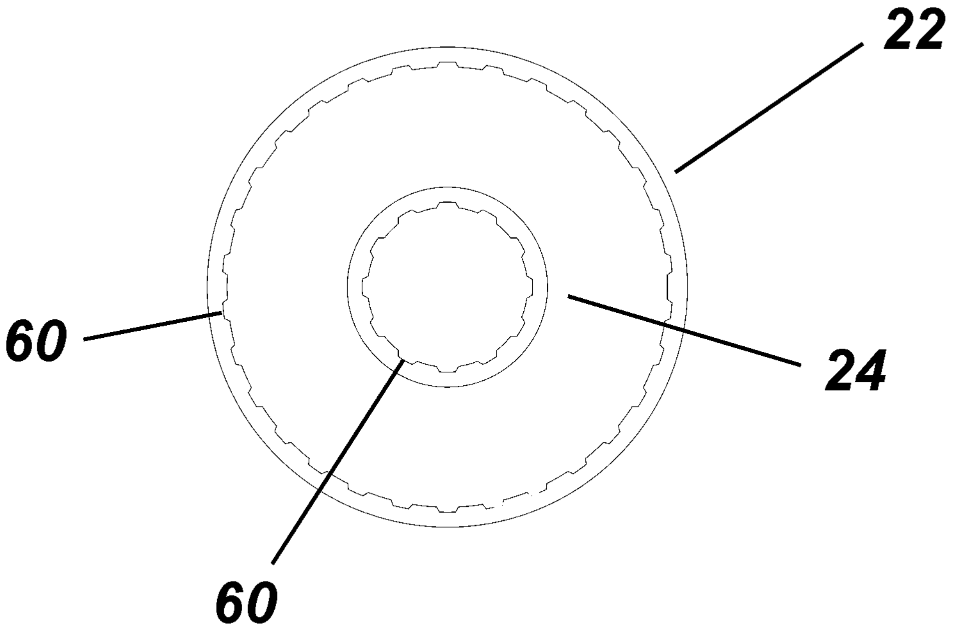
FIG. 14B is an end view of both friction reducing sleeves.

Referring to FIG. 14, the large friction reducing sleeve 22 is housed inside of the hammer head chamber 46 and the small friction reducing sleeve 24 lines the hammer head through hole 48. In a preferred embodiment, the large 22 and small 24 friction reducing sleeves are made of low friction plastic such as Delrin® (polyoxymethylene). Sleeve grooves 60 disposed on the inner surface of the large 22 and small 24 friction reducing sleeves reduce the amount of surface contact between the impact hammer head 30 and the shaft 44 and the two sleeves 22 and 24. Importantly, the sleeve grooves 60 prevent pressure build up inside the hammer head cavity 46 upon impact hammer head 30 compression by allowing the air to pass through its gaps.

Figure 15:
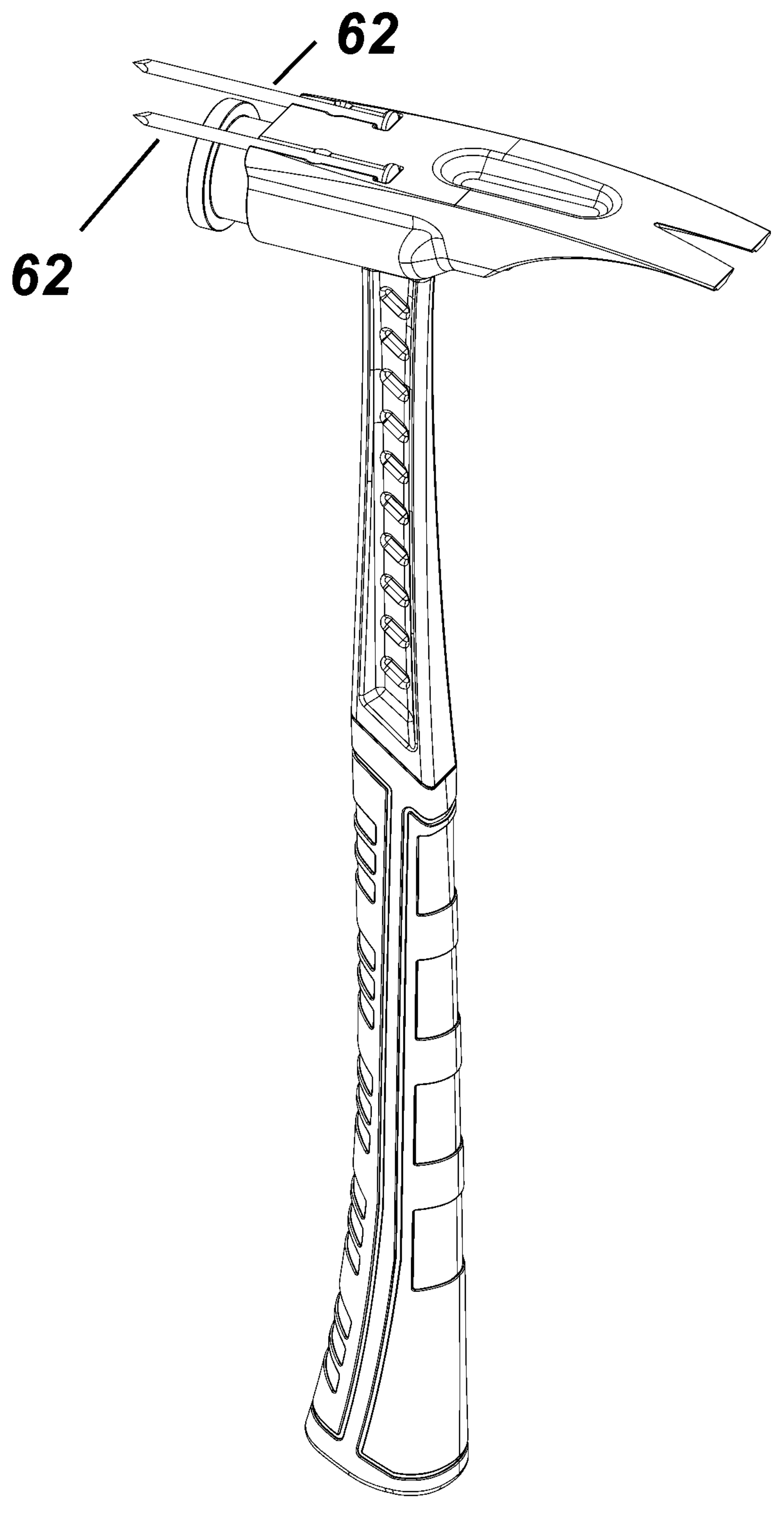
FIG. 15 is a perspective view of the hammer with framing nails.
Figure 16A:
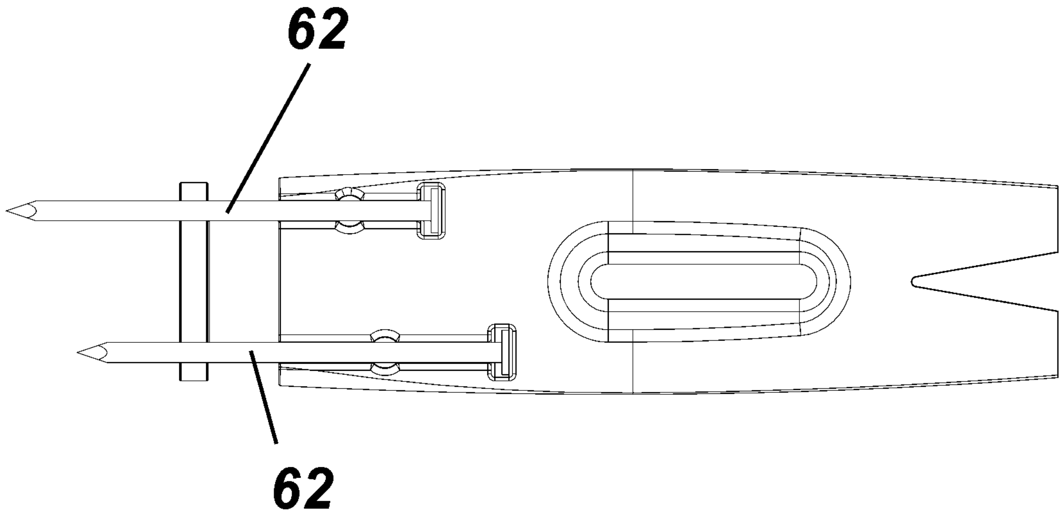
FIG. 16A is a top view of the hammer head with framing nails.
Figure 16B:
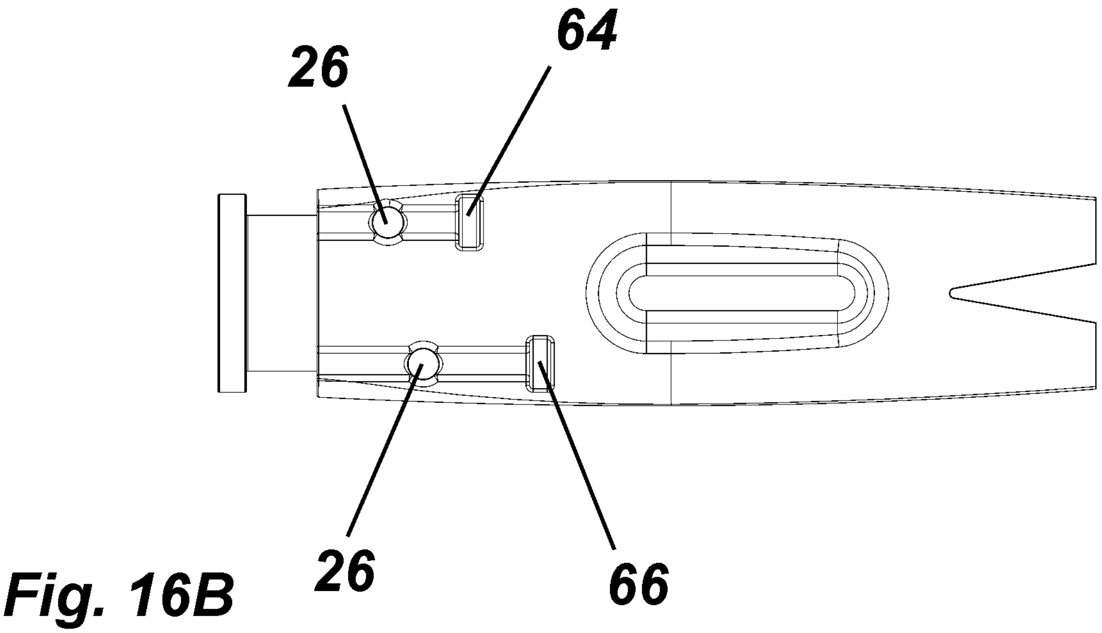
FIG. 16B is a top view of the hammer head with framing nails at an offset.

Referring to FIGS. 15 and 16, the framing nails 62 are held in grooves 64 and 66 by magnets 26 placed within said grooves 54, 66 by providing magnetic securement. The grooves 64 and 66 are disposed on the top surface of the hammer head portion 14. The framing nails 62 can be tacked into a material using said grooves 64, 66 before applying the final blows. The difference in length between the grooves 64 and 66 allows for placing of two framing nails 62 in sequential order starting with the shorter groove 64 followed by longer groove 66 instead of traditional one framing nail 62 at the time.

Figure 17A:
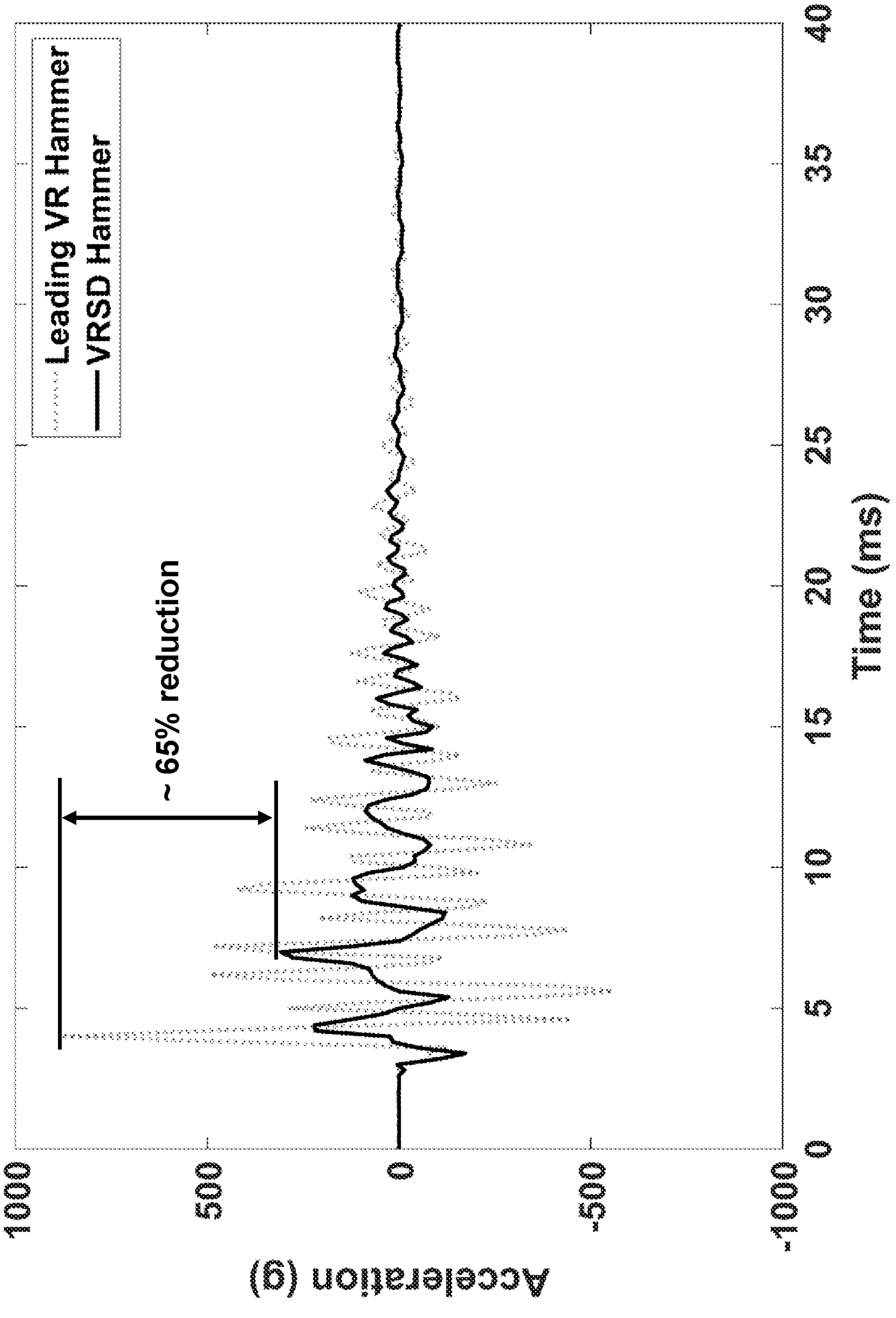
FIG. 17A is a performance chart of the hammer.
Figure 17B:
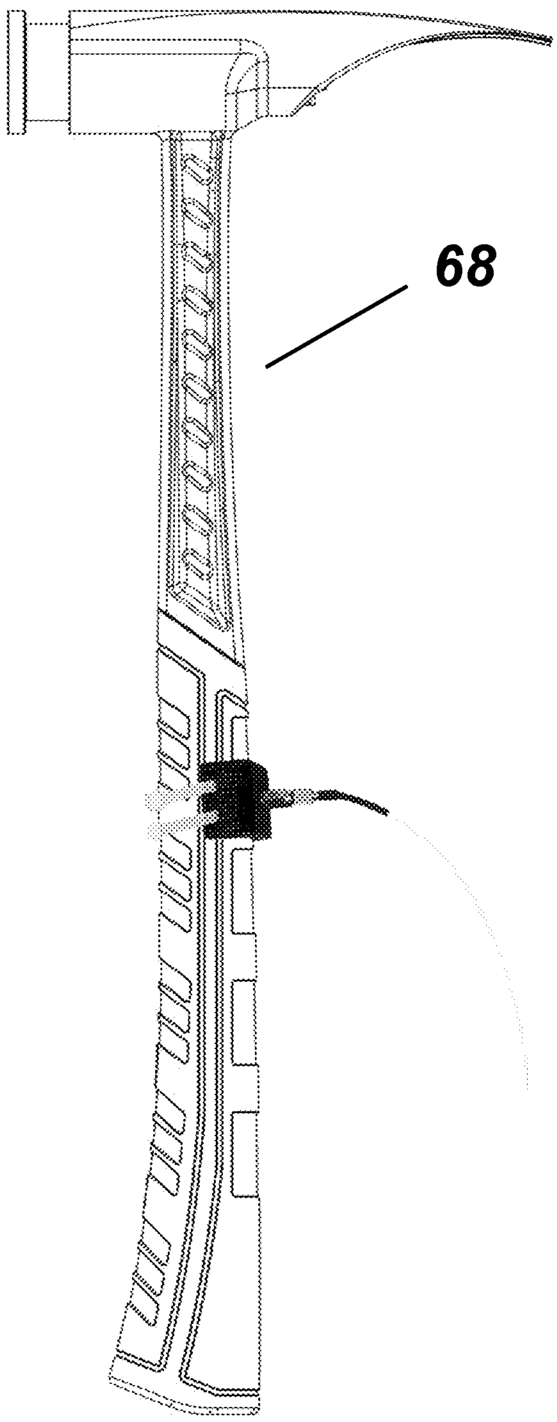
FIG. 17B is a pictorial of sensor placement.

Referring to FIGS. 17A and 17B, a typical performance of VRSD hammer showing up to 65% reduction in peak acceleration in time domain graph as compared to a leading Vibration Reducing (VR) hammer 68 FIG. 17A and shock accelerometer placement during an experiment using a functional prototype VRSD hammer design and a commercially-available leading VR hammer FIG. 17B.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents and publications mentioned in this specification are indicative of the levels of those skilled in the art to which the invention pertains. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A hammer, comprising:

a hammer body defined by a head portion, a neck portion and a grip portion;

a vibration reducing spring damper (VRSD) mechanism housed within a cavity of said hammer body head portion, said VRSD mechanism assembly comprising:

an impact head protruding through said head portion, said impact head having an aperture with a shaft extending therethrough;

a compression spring positioned inside said cavity, said compression spring coupled to a first wall of said cavity on one side and a front washer on a second wall of said cavity;

a front damper secured between said front washer and said first wall of said cavity;

a rear damper secured between a through hole wall and a rear washer;

a retaining ring secured along a distal end of said VRSD mechanism coupling said VRSD mechanism to said head portion;

a large friction reducing sleeve housed within said cavity; and a small friction reducing sleeve housed through said aperture;

wherein when said hammer impact head is retracted inside said cavity forcing said compression spring and said front damper into a compressed state creating a spring-damper system which reduces the amount of vibration when striking an object.

2. The hammer according to claim 1, wherein said compression spring is pre-tensioned in its resting state.

3. The hammer according to claim 1, wherein said front damper and said rear damper are made of a viscoelastic material.

4. The hammer according to claim 1, wherein said large friction reducing sleeve is made of low friction plastic.

5. The hammer according to claim 1, wherein said small friction reducing sleeve is made of low friction plastic.

6. The hammer according to claim 1, wherein a sleeve groove disposed on the inner surface of said large friction reducing sleeve and said small friction reducing sleeve reduces the amount of surface contact between said hammer impact head, said shaft, and said large friction reducing sleeve and said small friction reducing sleeve.

7. The hammer according to claim 6, wherein said sleeve groove is constructed and arranged to prevent pressure build up inside said cavity upon hammer impact head compression by allowing air to pass through its gaps.

8. The hammer, according to claim 1, wherein said rear damper mitigates vibrational shock related to said compression spring in its compressed state.

9. A hammer, comprising:

a hammer body having a head portion, a neck portion and a grip portion, said head portion having a plurality of grooves disposed on the top surface of said head portion constructed and arranged to receive framing nails;

a vibration reducing spring damper (VRSD) mechanism housed within a cavity of said hammer body head portion, said VRSD mechanism assembly comprising:

an impact head protruding through said head portion, said impact head having an aperture with a shaft extending therethrough;

a compression spring positioned inside said cavity, said compression spring coupled to a first wall of said cavity on one side and a front washer on a second wall of said cavity;

a front damper secured between said front washer and said first wall of said cavity;

a rear damper secured between a through hole wall and a rear washer wherein said rear damper is constructed and arranged to mitigate vibrational shock;

a retaining ring secured along a distal end of said VRSD mechanism coupling said VRSD mechanism to said head portion;

a large friction reducing sleeve housed within said cavity; and a small friction reducing sleeve housed through said aperture;

a plurality of magnets disposed within said plurality of grooves, wherein said plurality of magnets provide magnetic securement of framing nails;

wherein when said hammer impact head is retracted inside said cavity forcing said compression spring and said front damper into a compressed state creating a spring-damper system which reduces the amount of vibration when striking an object.

10. The hammer according to claim 9, wherein said plurality of grooves have different lengths, allowing for placement of two framing nails in sequential order starting with a shorter groove followed by a longer groove.

11. The hammer according to claim 9, wherein said compression spring is pre-tensioned in its resting state.

12. The hammer according to claim 9, wherein said front damper and said rear damper are made of a viscoelastic material.

13. The hammer according to claim 9, wherein said large friction reducing sleeve is made of low friction plastic such as polyoxymethylene.

14. The hammer according to claim 9, wherein said small friction reducing sleeve is made of low friction plastic such as polyoxymethylene.

15. The hammer according to claim 9, wherein a sleeve groove disposed on the inner surface of said large friction reducing sleeve and said small friction reducing sleeve reduces the amount of surface contact between said hammer impact head, said shaft, and said large friction reducing sleeve and said small friction reducing sleeve.

16. The hammer according to claim 15, wherein said sleeve groove is constructed and arranged to prevent pressure build up inside said cavity upon hammer impact head compression by allowing air to pass through its gaps.

* * * * *